July 7, 1970 E. A. FEUELL 3,519,853

ELECTRICAL SAMPLING GATES

Filed Feb. 8, 1967 2 Sheets-Sheet 1

July 7, 1970 E. A. FEUELL 3,519,853

ELECTRICAL SAMPLING GATES

Filed Feb. 8, 1967 2 Sheets-Sheet 2

United States Patent Office 3,519,853
Patented July 7, 1970

3,519,853

ELECTRICAL SAMPLING GATES

Edward Albert Feuell, Harlow, England, assignor to International Standard Electric Corporation, New York, N.Y., a corporation of Delaware Filed Feb. 8, 1967, Ser. No. 614,697
Claims priority, application Great Britain, Feb. 11, 1966, 6,093/66
Int. Cl. H03k *17/00*
U.S. Cl. 307—257 13 Claims

ABSTRACT OF THE DISCLOSURE

The invention relates to an electrical sampling gate including a diode or transistor bridge network which is used to obtain a sample of the derivative of an input signal. In other gates the parameters of the semiconductive devices have to be selected to very close tolerances otherwise the output may be asymmetrical due to bridge unbalance whereas in this circuit the parameters are less important since unbalance is stored on a capacitance (forming part of derivative network) after the first sampling pulse. In one embodiment the second derivative is obtained by placing an inductance in parallel with the resistance which forms part of the derivative network. A number of these sampling gates may be operated in series or in parallel.

The invention relates to an electrical sampling gate with particular but not necessarily exclusive application to communication systems.

The invention provides an electrical sampling gate including a bridge network each arm of which contains a semiconductive device, means for applying a gating pulse to said bridge network, and means for obtaining a sample of the derivative of an input signal applied to said bridge network.

The foregoing and other features according to the invention will be understood from the following description with reference to the accompanying drawings, in which.

Figure 1:
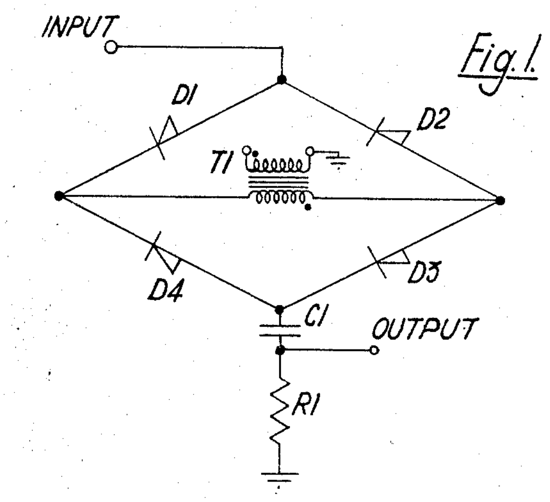
FIG. 1 shows an electrical sampling gate which utilises a diode bridge arrangement.

Referring to FIG. 1, an electrical sampling gate which utilises a diode bridge arrangement is shown. The electrical gate which samples an electrical waveform at regular intervals of time comprises four semiconductor diodes D1 to D4, for example silicon, gallium arsenide, or germanium, connected to form a bridge arrangement, the cathodes of the semiconductor diodes D1 and D4 are connected together, the anodes of the semiconductor diodes D2 and D3 are connected together, and the cathodes of the semiconductor diodes D2 and D3 are respectively connected to the anodes of the semiconductor diodes D1 and D4.

The junction of semiconductor diodes D1 and D4 is connected to the junction of the semiconductor diodes D2 and D3 via the secondary winding of a transformer T1.

The junction of semiconductor diodes D3 and D4 is connected to earth potential via a capacitance C1 and a resistance R1, the output from the electrical sampling gate being taken from the junction of the capacitance C1 and the resistance R1.

Figures 2, 3:
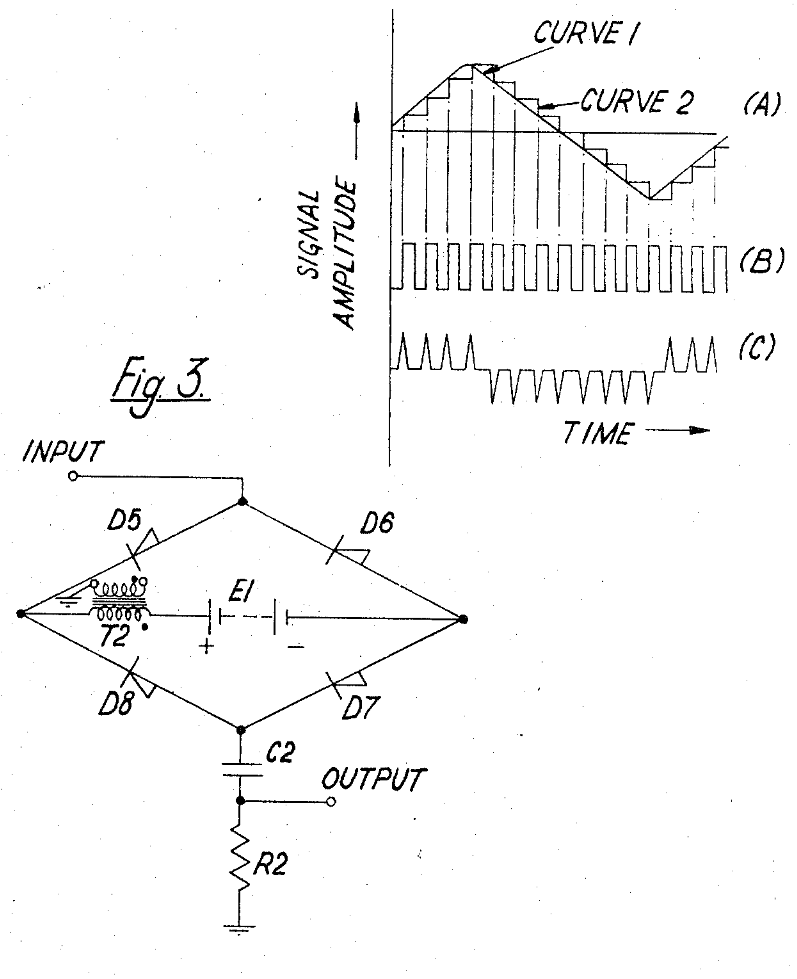
FIG. 2 shows the signal waveforms for the electrical sampling gate shown in the drawing according to FIG. 1.
FIG. 3 shows an alternative arrangement for the electrical sampling gate shown in the drawing according to FIG. 1.

The input to the electrical sampling gate which is applied at the junction of the semiconductor D1 and D2 is represented by curve 1 shown in the drawing according to FIG. 2.

The primary winding of the transformer T1 which has one side connected to earth potential provides the means for applying the gating pulses, shown in the drawing according to FIG. 2, to the circuit.

When the input to the electrical sampling gate is positive with respect to the voltage across the capacitance C1 and a pulse as shown in the drawing according to FIG. 2 is applied to the circuit via the transformer T1, a current will flow through the semiconductor diodes D1 and D3 to charge the capacitance C1 to the value of the input voltage. A current will also flow through the resistance R1 which will produce an output voltage, the peak value of which will depend on the rate the capacitance C1 is charged. When the pulse is removed from the transformer T1, no current will flow and the capacitance C1 remains fully charged at the same value until the next pulse arrives, the voltage across the capacitance C1 will then charge to the new value of the input. The output signal developed across the resistance R1 is shown in the drawing according to FIG. 2.

The curve 2 shown in the drawing according to FIG. 2 is representative of the waveform at the junction of the semiconductor diodes D4 and D3 and the capacitance C1.

The electrical sampling gate circuit is perfectly symmetrical, and when the input is negative with respect to the voltage across the capacitance C1, the current flows from the capacitance C1 through the semiconductor diodes D4 and D2. The output voltage of the gate circuit, measured across the resistance R1 is the sampled value of the differential of the input.

The semiconductor diodes D1 to D4 require a small forward bias before they conduct and it is for this reason that no current flows when the gating pulse is absent, provided the difference between the input signal and the voltage across the capacitance C1 does not exceed this bias voltage.

Input signals of any amplitude may be employed as long as the frequency of the pulses applied to the transformer T1 is sufficient to ensure the voltage difference between samples does not exceed the threshold voltage of the semiconductor diodes D1 to D4.

The effect of the low threshold voltage of the semiconductor diodes may be overcome by applying a negative or back bias potential to the semiconductor diodes by means of a bias voltage as shown in the drawing according to FIG. 3.

The electrical sampling gate shown in the drawing according to FIG. 3 is exactly the same as the gate shown in the drawing according to FIG. 1 except a bias voltage source E1, for example, a battery, is placed in series with the secondary winding of the transformer T1.

The bias voltage source E1 biases the semiconductor diodes into the non-conducting condition. In this circuit, the input signal difference between samples has to exceed the forward bias of the semiconductor diodes plus the reverse bias E1 before the semiconductor diodes conduct.

The voltage source E1 may be replaced by a suitable high resistance in parallel with a capacitor thereby producing a self bias.

The electrical sampling gates shown in the drawings according to FIGS. 1 and 3 prevents the output signal from being asymmetrical without the need for closely matching the parameters of the semiconductor diodes D1 to D4 since any unbalance in the bridge arrangement is stored on the capacitance C1 after the first sampling pulse.

Figure 4:
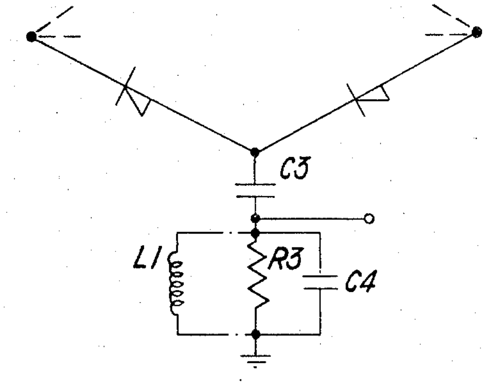
FIG. 4 shows a further alternative arrangement for the electrical sampling gate shown in the drawing according to FIG. 1.

Referring to FIG. 4, an alternative arrangement for the electrical sampling gate shown in the drawing according to FIG. 1 is shown, the difference between the two sampling gates being the introduction of an inductance L1 which is placed in parallel with the resistance R3. These two components together with the stray capacitance C4 provides a tuned circuit arrangement in the output. This tuned circuit is critically damped by the resistance R3 and the approximate second derivative of the input signal will therefore be produced across the resistance R3.

Figure 5:
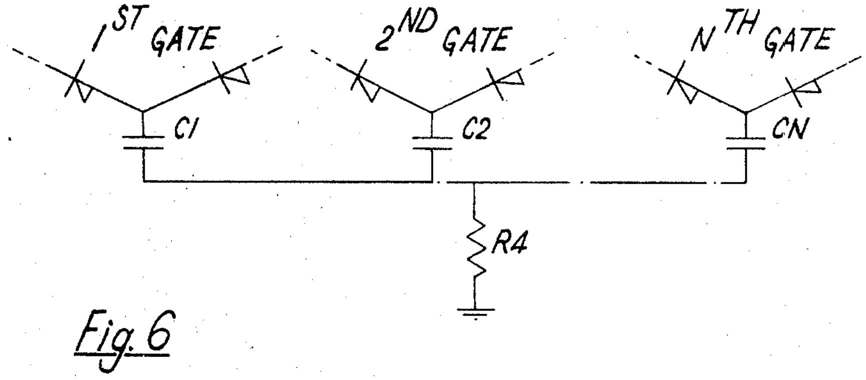
FIG. 5 shows a number of electrical sampling gates with a common output resistance.

As shown in the drawing according to FIG. 5, a number of gates may be operated in parallel with the gating or sampling pulse applied to all the transformers at the same time. The primaries of the transformers may be connected in series or in parallel depending on the configuration required.

The outputs of all the sampling gates may be fixed at the common output resistance R4 as shown in the drawing according to FIG. 5 or they may be operated in parallel with the gating pulse applied to the primary winding of each transformer in sequence, the output being obtained from the common resistance R4.

The transformers used in the electrical sampling gates as described in preceding paragraphs may have any desired transformation ratio, to match the gating pulse source not shown in the drawings.

Figure 6:
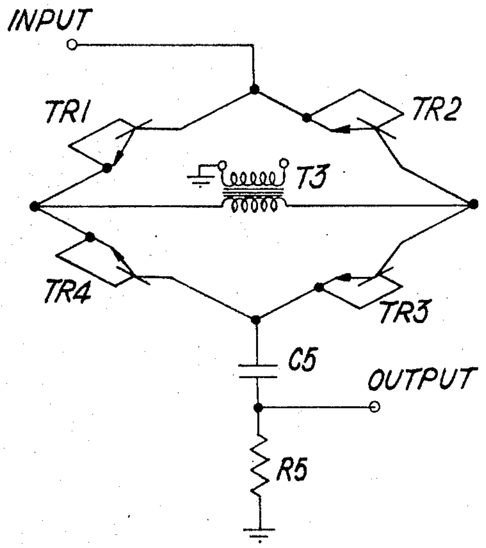
FIG. 6 shows an electrical sampling gate which utilises a transistor bridge arrangement.

Referring to FIG. 6, an electrical sampling gate which utilises a transistor bridge arrangement is shown. The only difference between this sampling gate and the ones previously described is that the semiconductor diodes are replaced by transistors TR1 to TR4 in the bridge arrangement. The transistors may be connected as shown or the base connections may be connected to a bias source in order to simulate the conditions of the sampling gate shown in the drawing according to FIG. 3 i.e. the input signal difference between samples may be increased giving the circuit a wider range of operation. The capacitance C5, resistance R5 and the transformer T3 perform the same functions as outlined in the preceding paragraphs.

It is to be understood that the foregoing description of specific examples of this invention is made by way of example only and it is not to be considered as a limitation on its scope.

What we claim is:

1. An electrical sampling gate including a bridge network each arm of which contains a semiconductive device, means for applying a gating pulse to said bridge network, means for obtaining a simple of the derivative of an input signal applied to said bridge network; said means for obtaining a sample of the derivative of an input signal applied to said bridge network is provided by a capacitance and resistance connected in series between one side of one diagonal of said bridge and earth potential, the output signal being taken from the junction of said capacitance and resistance; wherein said capacitance overcomes the unbalance of said bridge network; and wherein an inductance is connected in parallel with said resistance thereby providing the means for obtaining a sample of the second derivative of said input signal.

2. An electrical sampling gate as claimed in claim 1, wherein said semiconductive devices are semiconductor diodes.

3. An electrical sampling gate as claimed in claim 2 wherein said semiconductor diodes are selected from the group consisting of silicon galluim arsenide, and germanium.

4. An electrical sampling gate as claimed in claim 3 wherein said semiconductive devices are transistors.

5. An electrical sampling gate as claimed in claim 1 wherein said means for applying a gating pulse to said bridge network is provided by a transformer, the secondary winding of said transformer being connected across that diagonal of said bridge network to which said capacitor is not connected.

6. An electrical sampling gate as claimed in claim 5 wherein said input signal is connected to the other side of said diagonal of said bridge network to which said capacitor is connected.

7. An electrical sampling gate as claimed in claim 6 wherein a bias voltage source is connected in series with said secondary winding of said transformer.

8. An electrical sampling gate as claimed in claim 7 wherein said bias voltage source is provided by a battery.

9. An electrical sampling gate as claimed in claim 6 wherein a resistance connected tin parallel with a capacitance is connected in series with said secondary of said transformer.

10. An electrical sampling system which utilises a plurality of electrical sampling gates as claimed in claim 5, wherein said plurality of sampling gates are connected in parallel and the gating pulses are applied to each of said sampling gates at the same time.

11. An electrical sampling system as claimed in claim 10 wherein the primary windings of the transformers of each of said plurality of electrical sampling gates are connected in parallel.

12. An electrical sampling system as claimed in claim 11 wherein said gating pulses are applied to the primary windings of each of said transformers in sequence.

13. An electrical sampling system as claimed in claim 12 wherein the outputs of said plurality of electrical sampling gates are developed across a common resistance.

References Cited

UNITED STATES PATENTS

| | | | |
|---|---|---|---|
| 2,963,638 | 12/1960 | Nuut et al. | 307—297 X |
| 2,991,416 | 7/1961 | Ramp et al. | 328—151 X |
| 3,098,214 | 7/1963 | Windes et al. | 307—257 X |
| 3,278,757 | 10/1966 | Ragen | 307—257 X |
| 3,302,039 | 1/1967 | Baker | 307—257 X |
| 3,345,520 | 10/1967 | Browning et al. | 307—257 X |

DONALD D. FORRER, Primary Examiner

D. M. CARTER, Assistant Examiner

U.S. Cl. X.R.

307—243; 328—151